(12) United States Patent
Revels et al.

(10) Patent No.: US 6,353,215 B1
(45) Date of Patent: Mar. 5, 2002

(54) CARRYING CASE AND A METHOD OF MAKING THEREOF

(76) Inventors: Eric Revels, 1137 S. Turkey Creek Rd., Leicester, NC (US) 28748; James Diaz, 43 Lakeview Rd., Asheville, NC (US) 28804

( * ) Notice: Subject to any disclaimer, the term of this patent is extended or adjusted under 35 U.S.C. 154(b) by 0 days.

(21) Appl. No.: 09/133,591

(22) Filed: Aug. 13, 1998

(51) Int. Cl.[7] .............................. H05B 6/62; A45C 13/00
(52) U.S. Cl. ....................... 219/770; 190/126; 190/27; 383/13; 383/16; 383/17; 383/59; 383/907; 206/811
(58) Field of Search ............................ 383/907, 16, 89, 383/17, 13, 59, 6; 206/811; 219/764, 633, 765, 769, 770; 220/DIG. 29; 190/126, 27; 224/235, 655, 236, 237

(56) References Cited

U.S. PATENT DOCUMENTS

| | | | | |
|---|---|---|---|---|
| 1,317,532 A | * | 9/1919 | Watkins | 383/17 |
| 1,910,789 A | * | 5/1933 | Brady | 383/16 X |
| 2,423,889 A | * | 7/1947 | Hurt | 383/61 |
| 3,176,743 A | * | 4/1965 | Bundy | 383/907 X |
| 3,955,728 A | * | 5/1976 | Jackson et al. | 383/907 X |
| 3,998,304 A | * | 12/1976 | Edgerton, Jr. et al. | 383/89 X |
| 4,207,937 A | * | 6/1980 | Sandeman et al. | 383/17 |
| 4,294,299 A | * | 10/1981 | Dorsen et al. | 150/46 |
| 4,596,337 A | * | 6/1986 | Gerold et al. | 215/100 |
| 4,674,127 A | * | 6/1987 | Yamada et al. | 383/16 |
| 4,781,473 A | * | 11/1988 | La Fleur | 383/16 |
| 4,809,852 A | * | 3/1989 | Mancini | 383/907 X |
| 4,953,550 A | * | 9/1990 | Dunshee | 383/102 |
| 4,997,416 A | * | 3/1991 | Mitchell et al. | 156/309.6 |
| 5,059,035 A | * | 10/1991 | Kristensen | 383/33 |
| 5,261,532 A | * | 11/1993 | Fauci | 383/63 X |
| 5,289,960 A | * | 3/1994 | Kelly et al. | 224/235 X |
| 5,297,870 A | * | 3/1994 | Weldon | 383/59 |
| 5,540,366 A | * | 7/1996 | Coomber | 383/59 X |
| 5,804,265 A | * | 9/1998 | Saad et al. | 383/63 |
| 5,845,806 A | * | 12/1998 | Parchman | 220/739 |

* cited by examiner

*Primary Examiner*—Allan N. Shoap
*Assistant Examiner*—Tri M. Mai

(57) ABSTRACT

The invention relates to a soft-sided carrying case and a method of manufacture thereof. The carrying case is made from moisture-impermeable, flexible, stretchable material, particularly adapted for outdoor use. A main body of the bag is secured by dielectric welding with a pair of drop-shaped end panels to form the carrying case. The main body, being cut on a bias, allows stretching of narrow ends of the main body to substantially conform to the drop-shaped end panels and form a wrinkle-free attachment.

7 Claims, 5 Drawing Sheets

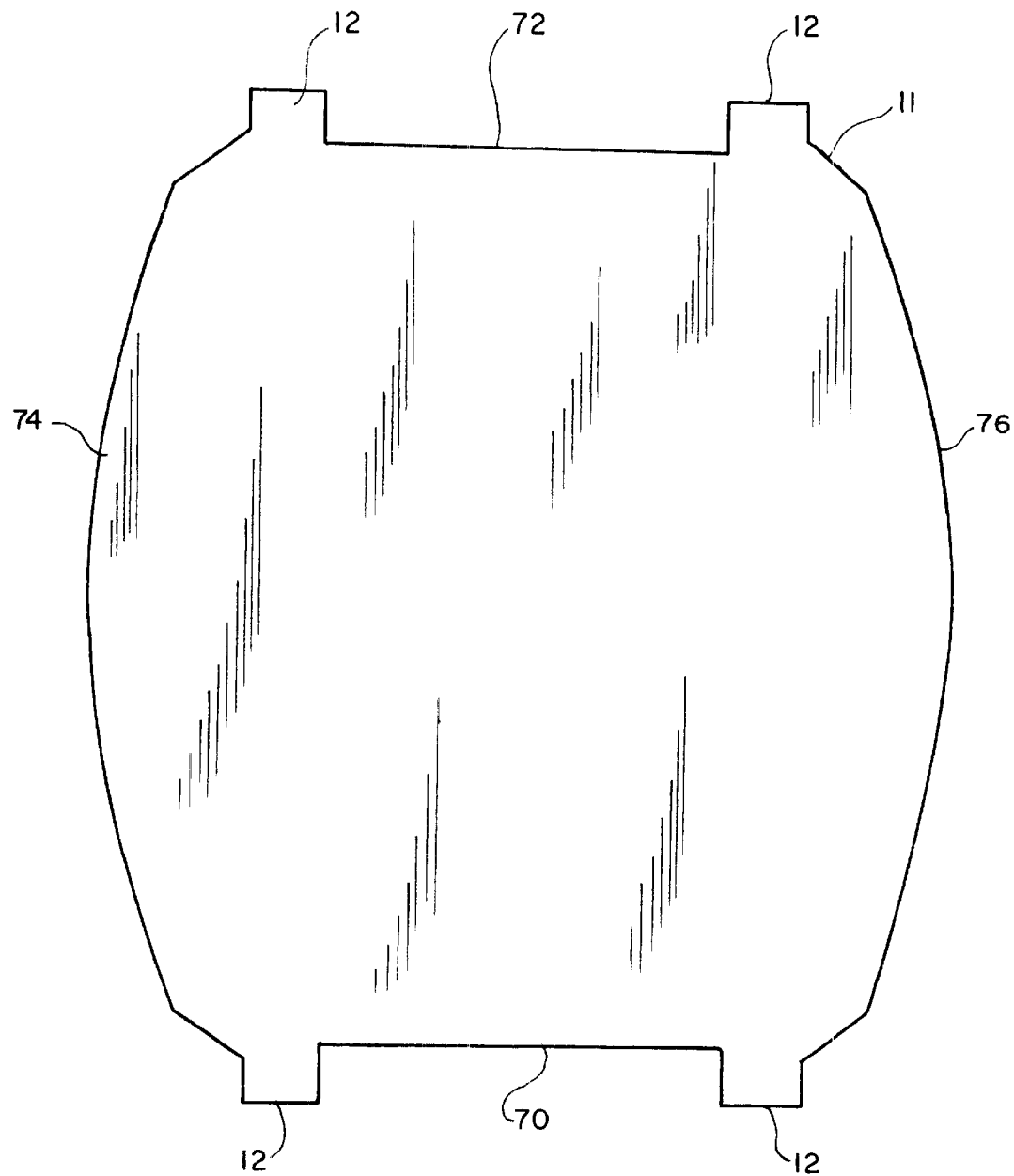
F I G . 2

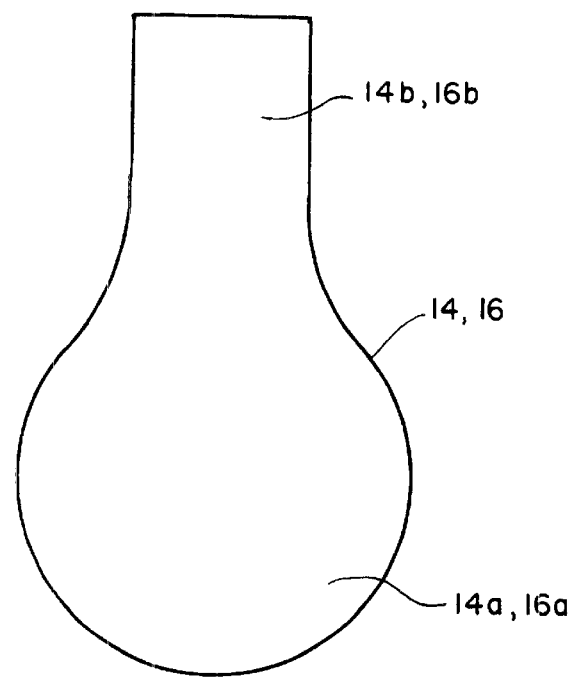
F I G. 3
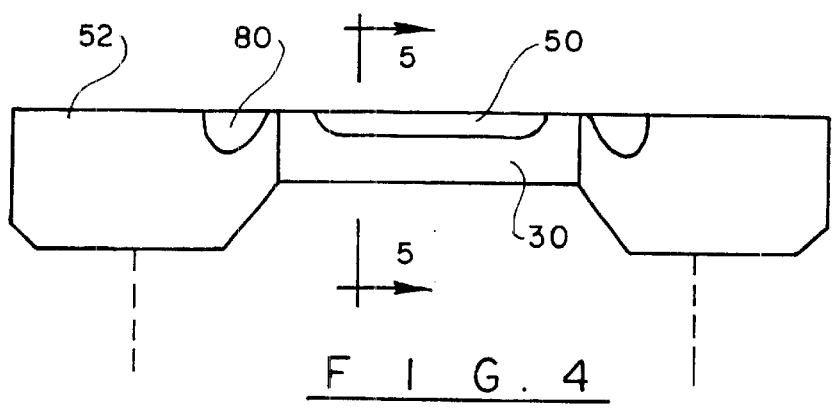
F I G. 4
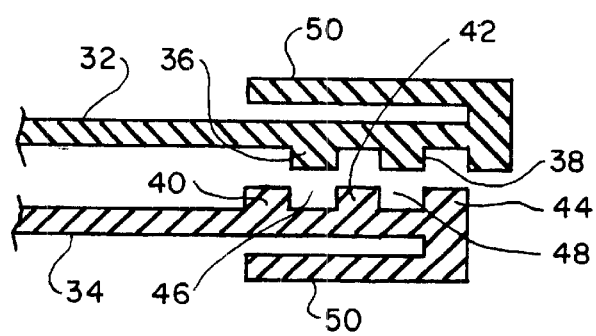
F I G. 5

CARRYING CASE AND A METHOD OF MAKING THEREOF

BACKGROUND OF THE INVENTION

The present invention relates to a carrying case and a method of manufacturing thereof, and more particularly to a bag and method of manufacturing soft-sided bags particularly adapted for outdoor activities.

People engaged in outdoor activities usually carry a number of items, such as food supplies, ammunition for hunting guns, and other similar items that need to be protected from moisture. Under such conditions, provision of a moisture-impermeable carrying case or container becomes essential.

Conventional carrying cases or containers are not, as a general rule, completely watertight. Moisture can seep through the line of closure, through zippers, openings under the zippers and cause deterioration of the contents of the carrying case. Even bags or carrying cases constructed from water repellent material suffer from imperfections in construction, as they do not allow creation of truly a watertight enclosure.

The present invention contemplates elimination of drawbacks associated with the prior art and provision of a carrying case and a method of manufacturing a moisture-impermeable bag that can serve as a container for moisture-sensitive items.

SUMMARY OF THE INVENTION

It is, therefore, an object of the present invention to provide a bag and a method of manufacturing a moisture-impermeable carrying case.

It is another object of the present invention to provide a carrying case and a method of making same, such the bag is moisture-impermeable.

It is a further object of the present invention to provide a bag and a method of manufacturing a moisture-impermeable carrying case with a flexible body.

These and other objects of the present invention are achieved through a provision of a bag and a method for manufacturing soft-sided moisture-proof carrying case. The method comprises the steps of forming a main body having opposite narrow ends and elongated sides. The main body is made from material cut on a bias.

A pair of end panels, having a generally drop-shaped configuration are cut from the same material. Each end panel is attached to a respective narrow end of the main body by dielectric welding. To avoid wrinkles in the finished product, the narrow ends of the main body are stretched to confirm to the size and shape of the end panel.

The soft-sided bag can be manufactured with one or more handles, each carrying securing buckles, if desired. A zip-lock closure member is secured by dielectric welding to the open end of the bag after the end panels have been secured. The closure member can be made from extruded plastic material and provided with pull-out tabs to facilitate opening of the bag.

To prevent tearing of the closure adjacent its line of attachment to the main body, an end sleeve is secured to the main body and to the closure member, slightly overlapping the closure member and the main body. The end sleeve is provided with a reservoir to accommodate melted material, which is created when the closure element is exposed to radio frequency, or dielectric welding.

The soft-sided carrying case manufactured in accordance with the method of the present invention can be made in the shape of a duffel bag, a gun carrying case, or any other desired shape. By using double-coated embossed polyurethane for the main body and the end panels, as well as zip-lock closure member, a moisture-impermeable body is created. The main body is coated with #420 denier nylon for better appearance and variations in color and texture.

BRIEF DESCRIPTION OF THE DRAWINGS

Reference will now be made to the drawings, wherein like parts are designated by like numerals, and wherein

FIG. 2 is a top view of the bag main body, before welding.

FIG. 3 is a second end piece for use in the bag manufactured in accordance with the present invention.

FIG. 4 is a side view of a closure member.

FIG. 5 is a detail cross-sectional view of the closure member taken along line 5—5 of FIG. 4.

FIG. 8 is a detail view showing a bag corner construction with the closure element and pull-out tabs.

DETAILED DESCRIPTION OF THE PREFERRED EMBODIMENT

Figure 1:
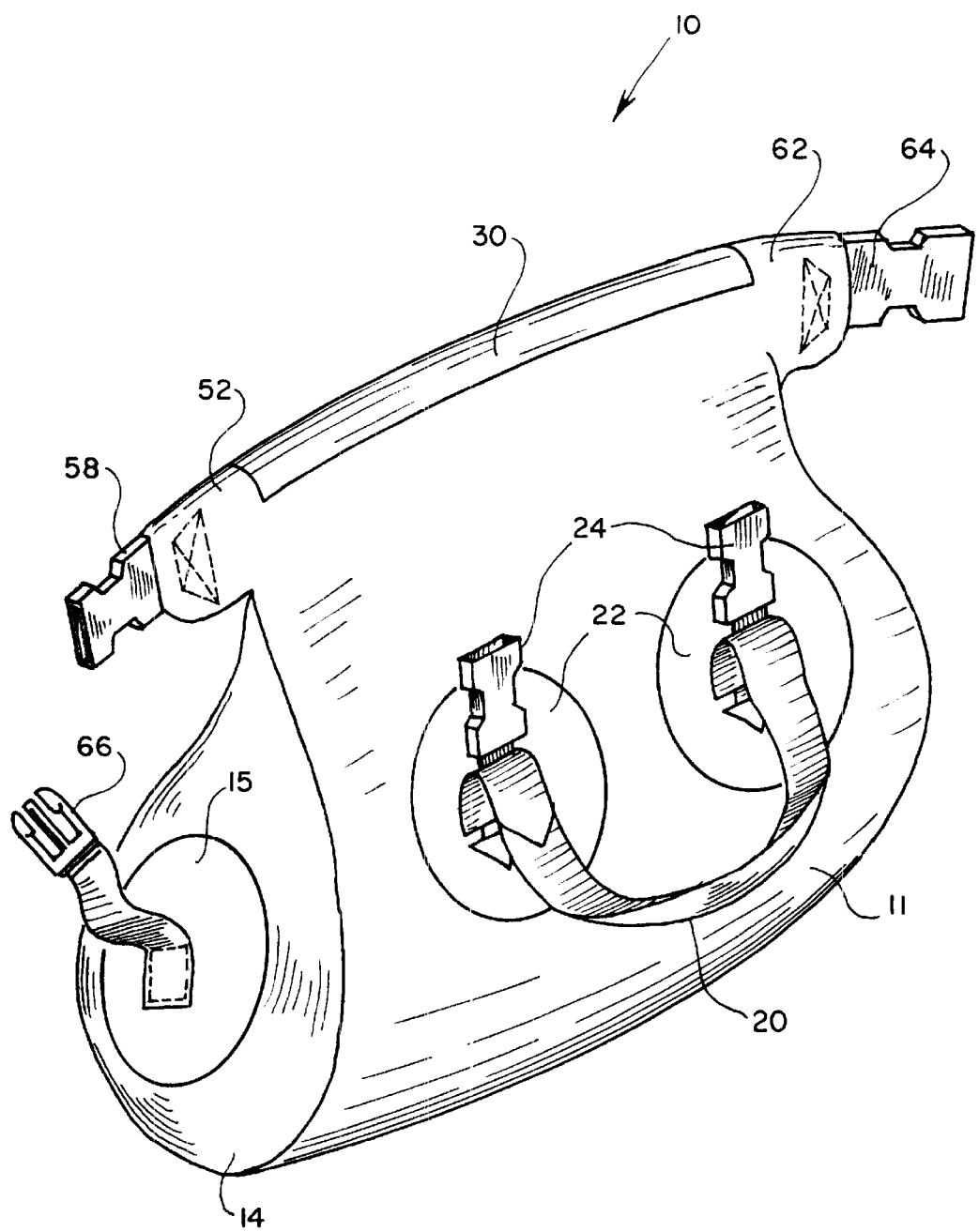
FIG. 1 is a perspective view of the bag manufactured in accordance with the present invention.

Turning now to the drawings in more detail, reference will now be made to the drawings, presented for illustrative purposes only, wherein numeral 10 designates the bag manufactured according to the method of the present invention. The main body of the bag 11 is made from a moisture-impermeable material, for example, double coated embossed polyurethane, with a base layer of #420 denier nylon. Of course, other materials can be used to manufacture bags of the present invention, as long as the materials are similar in physical and chemical characteristics to polyurethane.

The main body 11 is provided with four corner tabs 12, which are used for stretching the main body 11 over a weld form, as will be explained in more detail hereinafter. The main body 11 is cut from a sheet of polyurethane material, cut on a bias of approximately 45 degrees. By cutting the material on a bias, certain stretching and "giving" of the material is achieved, which facilitates wrinkle-free attachment of the end panels to the main body 10.

FIGS. 3 illustrates the drop-shaped end panels 14 and 16 that are attached to the main body 11 during making of the bag 10. The end panels 14 and 16 comprise a rounded portion 14a and 16a, as well as an elongated extended portions 14b and 16b.

FIG. 1 illustrates a first handle 20 secured on the main body 11. The handle 20 is made from a narrow strip of a strong, tear-resistant fabric that can be folded in two, if necessary, and stitched together to provide further thickness and strength to the handle 20. The main body of the handle is secured to attachment elements 22, which are made from scraps of the same material as the main body 11. The ends of the handle 20 carry female buckle elements 24 secured to the handle 20 in a conventional manner.

Although not shown in the drawings, a second carrying handle, made from the same material as the handle 20 is attached, at the opposite side of the main body 11, in a mirror-image position to the handle 20. Each end of the second handle carries a male end of a buckle. The buckle elements of the second handle are sized and shaped to engage with the female buckle elements 24 of the handle 20 to facilitate carrying of the bag.

FIGS. 4 and 5 illustrate a zip-lock closure member 30. The zip-lock closure member comprises a first portion 32 and a second portion 34. The first portion 32 is provided with a pair of elongated ribs 36 and 38 extending in a parallel relationship along the length of the portion 32. The second portion 34 is provided with three parallel ribs 40, 42 and 44, spaced from each other and defining engagement channels 46 and 48 for receiving the ribs 36 and 38 therein when the lock is closed. The closure member 30 has a length substantially equal to or smaller than the length of the main body 11.

A pair of pull out tabs 50 is provided on each portion 32 and 34 for grasping by a user to pull the two portions of the closure elements apart and allow the user to gain access to the interior of the bag 10, once it is constructed.

Figure 6:
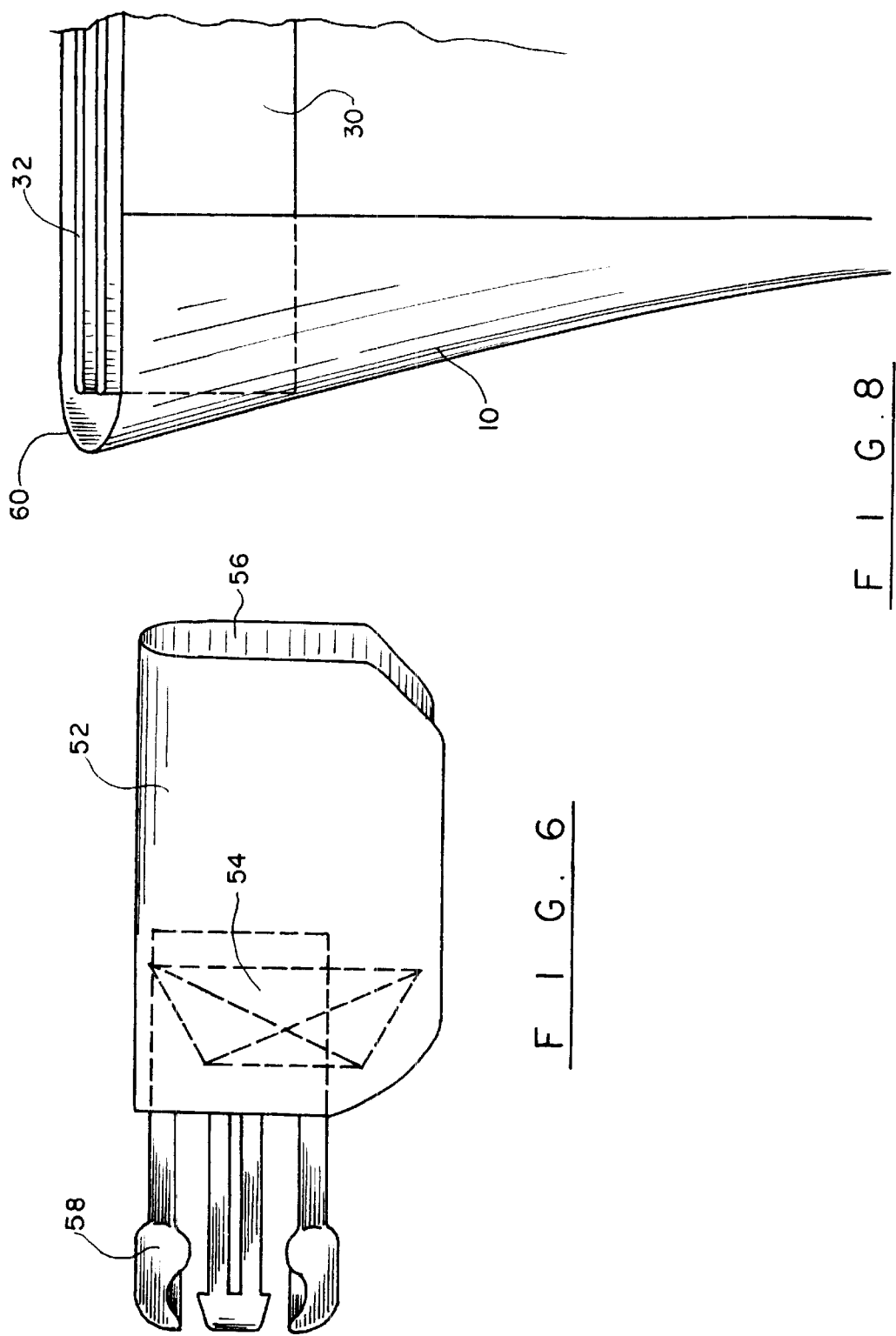
FIG. 6 is a perspective detail view of an end sleeve and the corner of the bag, wherein the sleeve is positioned.
Figure 7:
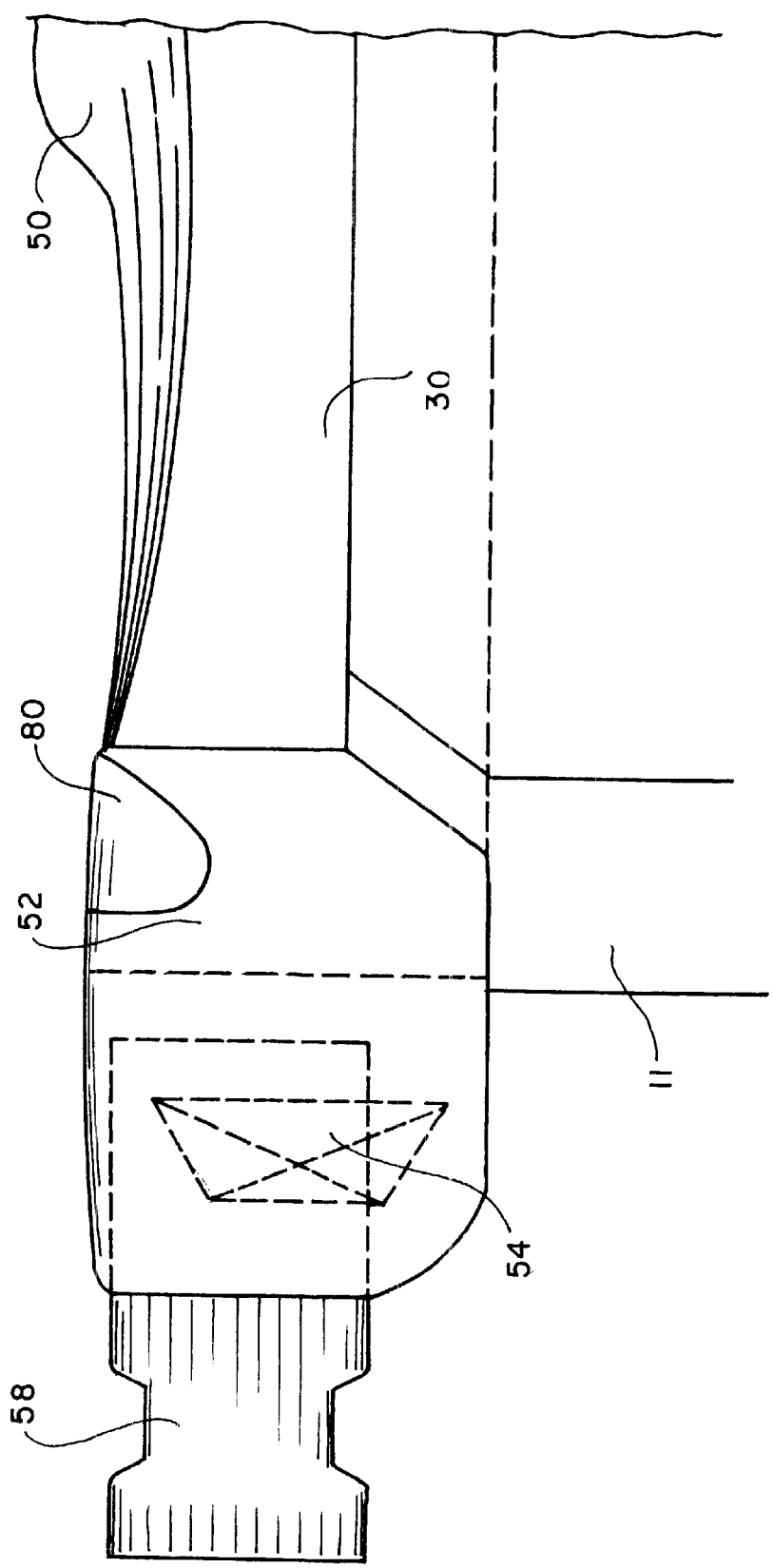
FIG. 7 is a perspective detail view of the end sleeve secured on the main body.

To prevent tearing of the closure member 30 during repeated opening of the bag 10, an end sleeve 52 is provided for attachment to the bag main body 11 and the closure member 30 about the line of attachment between these two structural members. The sleeve 52 comprises a folded piece of material stitched adjacent one end, as at 54 (see FIGS. 6 and 7) and open at the opposite end 56. During manufacture, the end sleeve 52 is positioned over a corner 60 and the closure element 30 adjacent its end (see FIG. 6). A similar end sleeve 62 is secured on the opposite end of the bag 10 (see FIG. 1).

If desired, the end sleeves 52 and 62 can carry a male element 58 and 64, respectively, of a buckle for engagement with female buckle elements 66 (only one is shown in FIG. 1), which are fixedly attached to the end panels 14 and 16.

In the manufacturing process of the present invention, the elements are secured together with the use of radio frequency in a process conventionally identified as RF, or dielectric welding. This method is used for joining polymers that have strong dipoles, including polyurethane. During dielectric welding method, a high intensity alternating electromagnetic field is applied to the dipoles. As the dipoles alternate with the changing field polarity, some of the field energy is converted into heat creating a weld seam between the two items. The weld times usually range from 1–6 seconds, depending on the material, thickness of the material, as well as the area being welded.

The apparatus for performing dielectric welding is available on the market, from, for example, Hall Dielectric Machinery Co., Inc. of Rock Hill, S.C. The instrumentation uses microprocessors to insure the necessary control during the weld cycle and wrinkle-free welding. The RF frequency generating machines can generate frequency in the range of 27.120 MHz ±0.06%. The instrumentation produces under 1 MW/sq. cm. of magnetic and electric radiation.

Turning now to the process of making the bag 10, the main body 11 is cut on a bias, and four corner tabs 12 are made in the body 11. Then, end panels 14 and 16 are either cut or stamped out of the remainder of material, after the main body 11 has been cut. The attachment members 15, 22 and end sleeves 52, 62 are cut from scraps remaining after the end panels 14 and 16 have been cut out.

The process continues with the attachment of the handles 20 and 26 to the main body 10. The handles, having secured thereon the buckles 24 are secured to the attachment members 22. One of the handles is then positioned adjacent a first narrow end 70 on the main body 11, so that the underside of the attachment piece 22 lies flat against the outer surface of the main body 11.

The position of the handle 20 and the attachment members 22 may be temporarily secured by removable conductor members formed from a material suitable for conducting radio waves therethrough. The body 11 with the handle 20 positioned at a predetermined location thereon is exposed to radio frequency waves for 2–4 seconds, allowing a cool down time of 1–2 seconds after the welding has been completed.

Once exposed to the radio frequency waves, the attachment members 22 become welded to the main body 11 in a secure, seamless manner. The same procedure is completed for the second handle, which is positioned adjacent a second narrow end 72 of the main body 11, in a mirror-image position to the handle 20. Of course, simultaneous positioning of both handles and exposure of the attachment members 22 to radio frequency waves can be accomplished, if desired.

The process continues with the securing of the female portions of buckles 66 to the end panels 14 and 16. The attachment members 15 are positioned with their inner surfaces contacting the outer surfaces of the end panels, in the central portions 14a and 16a. A RF-conductive conductive member is then positioned on top of the attachment elements 15, and the end panels 14 and 16 are exposed to radio frequency waves. The welding process continues for 2–4 seconds after which time the attachment members 15 become fused, or welded to the end pieces 14 and 16, thereby fixedly securing the buckle portions 15 on the end panels.

The process continues with attachment of the end panels 14 and 16 to the main body 11. First, the body 11 is secured on a vertically oriented RF-conductive stand (not shown), while the material of the main body 11 is stretched to conform to the stand configuration. The narrow end 70 or 72, while being stretched, approximates the size and shape of the end panel 14 or 16.

The tabs 12 are secured on the stand with a clamp, preventing shifting of the main body 11 during welding. The end piece 14 is then laid over the stand, covering at least a portion of the main body 11. An RF-conductive member is then positioned over the end piece 14, and the main body 11 with the end piece 14 is then exposed to RF waves for a predetermined period of time of about 2–4 seconds, followed by a cool-down time of about 1–2 seconds. During this step, the end piece 14 becomes permanently attached, in effect fused to the main body 11.

The same process is repeated for the second end panel, which is secured to the opposite narrow end 72 of the main body 10. The ends of the bag are formed as drop-shaped portions, which is different from conventional round end portions typically found in a duffel bag. The tabs 12 are then trimmed off, so as to present a neat overall appearance of the end portions of the bag 10.

The next step in the process is the attachment of the zip-lock closure member 30 to the bag body 11. For this purpose, the elongated sides 74 and 76 of the main body 11 are brought together, with one side 74 contacting one portion 32 of the closure 30, with the opposite elongated side 76 contacting the opposite portion 34 of the closure member 30. An elongated RF-conductive platen is then removably positioned between the closure portions 32 and 34. An additional RF-conductive platen is positioned under the main body 11 and a third RF-conductive platen is positioned over the four-layered fold.

This fold is then exposed to RF waves for a predetermined period of time, 4–6 seconds. The longer exposure is necessary to insure fusion or welding of the closure member 30 to the main body 11. During testing, it was observed that some of the material of the closure member 30 melts and tends to form an unsightly drop of molten plastic. To prevent such an undesirable effect, the present invention provides for a small reservoir 80 formed in each end sleeve 52 and 62 (see FIGS. 4 and 7). The reservoirs 80 are formed in the interior of the sleeves 52 and 62 and are large enough to accommodate the melted plastic from the closure member 30.

The bag manufactured in accordance with the present invention is flexible, somewhat stretchable, watertight and allows to retain a number of moisture-sensitive objects therein. It can be easily carried to a desired location by the flexible handles, transporting the supplies and/or sport ammunition to an outdoor location. Of course, other shapes can be used for the manufacture of the carrying case of the present invention. For example, a gun-carrying case can be made according to the same method and using dropshaped end panels. The method of manufacturing the soft-sided bag, or carrying case takes advantage of the radio frequency, or dielectric welding for the production of a seamless, wrinkle-free bag.

The types of materials used in the method of the present invention for the manufacturing of the bag can vary, depending on the particular purpose of the bag. The plastic material, double-coated embossed polyurethane is readily available on the market from, for example, URETEK, Inc. of New Haven, Conn. One of the tested materials had a polyether polyurethane coating of 4 oz./ sq. yd. The fabric layer was #420 denier nylon, 50×40 threads/inch. The weight of the fabric was 8 oz./sq. yd. The material tested with the method of the present invention has a tensile strength warp 400 lbs., fill 300 lbs., puncture resistance—80 lbs. The zip-lock closure member 30 made from extruded plastic is likewise readily available on the market in a roll form, allowing to cut the required length for manufacturing of a designated size of a bag. The buckles can be conventional slide release buckles with D-rings; they are readily available from a number of manufacturers.

Depending on the desired size of the resultant product, the dimensions of the main body 11 and the end panels 14 and 16 would differ, as well as the length of the handles and of the closure member 30.

Many changes and modifications can be made in the design and method of the present invention without departing from the spirit thereof. We, therefore, pray that our rights to the present invention be limited only by the scope of the appended claims.

We claim:

1. A method of manufacturing a soft-sided carrying case, comprising the steps of:

forming a main body from a piece of flexible material cut on a bias, said main body having a generally flat panel with narrow ends and elongated sides with outwardly arcuate edges;

forming a pair of drop-shaped end panels;

securing at least one handle to the main body by dielectric welding, thereby fusing said at least one handle to the main body;

securing a first end panel to a first narrow end of the main body by stretching the material cut on the bias of the main body such that the first narrow end of the main body generally conforms to the size and shape of the first end panel and by performing a dielectric welding of the first end panel with the main body while providing a wrinkle-free attachment of the first end panel to the main body;

securing a second end panel to a second narrow end of the main body by stretching the material cut on the bias of the main body such that the second narrow end of the main body generally conforms to the size and shape of the second end panel and by performing a dielectric welding of the second end panel to the main body while providing a wrinkle-free attachment of the second end panel to the main body;

securing a closure member between elongated sides of the main body by dielectric welding to thereby form a watertight carrying case, and securing an end sleeve over at least a portion of said main body and said closure member by dielectric welding so as to strengthen the main body for repeated opening of the closure member, and wherein said end sleeve is provided with a reservoir for retaining melted material created during attachment of said end sleeve to said main body.

2. The method of claim 1, wherein said closure member has zip-lock closing elements along substantially entire length thereof.

3. The method of claim 1, wherein said dielectric welding is conducted for a period of 2–4 seconds.

4. The method of claim 1, wherein each end of said at least one handle carries an attachment member to facilitate securing of said at least one handle to the main body.

5. The method of claim 1, wherein said main body and said end panels are made of a flexible, stretchable moisture-impermeable material.

6. The method of claim 1, wherein said material contains embossed polyurethane.

7. A method of manufacturing a soft-sided carrying case, comprising the steps of:

forming a main body from a piece of flexible material cut on a bias, said main body having a generally flat panel with narrow ends and elongated sides with outwardly arcuate edges;

formiing a pair of drop-shaped end panels;

securing at least one handle to the main body by dielectric welding, thereby fusing said at least one handle to the main body;

securing a first end panel to a first narrow end of the main body by stretching tbe material cut on the bias such that the first narrow end of the main body generally conforms to the size and shape of the first end panel and by performing a dielectric welding of the first end panel with the main body while providing a wrinkle free attachment of the first end panel to the main body;

securing a second end panel to a second narrow end of the main by stretching the material cut on the bias such that the serond narrow end of the main body conforms to the size and shape of the second end panel and by performing a dielectric welding of the second end panel to the main body while providing a wrinkle-free attachment of the second end panel to the main body;

securing a closure member between elongated sides of the main body by dielectric welding to providing four corner tabs on the main panel, said tabs retaining a pre-determined position of the main body when the main body is being stretched during attachment of the first panel and the second end panel.

* * * * *